US005894530A

United States Patent [19]
Wilt

[11] Patent Number: 5,894,530
[45] Date of Patent: *Apr. 13, 1999

[54] OPTICAL VIEWING SYSTEM FOR SIMULTANEOUSLY VIEWING INDICIA LOCATED ON TOP AND BOTTOM SURFACES OF A SUBSTRATE

[75] Inventor: Donald R. Wilt, Lexington, Mass.

[73] Assignee: Electro Scientific Industries, Inc., Portland, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 08/707,631

[22] Filed: Sep. 5, 1996

[51] Int. Cl.⁶ .................................................. G06K 9/20
[52] U.S. Cl. .................................................. 382/321
[58] Field of Search ........................... 382/312, 313, 382/314, 315, 316, 317, 318, 319, 320, 321, 322, 323, 324, 100, 101, 112, 141, 143, 144, 145, 147, 149, 151; 252/272; 356/237; 358/93

[56] References Cited

U.S. PATENT DOCUMENTS

| | | | |
|---|---|---|---|
| 3,587,856 | 6/1971 | Lemelson | 382/101 |
| 4,516,264 | 5/1985 | Corvari et al. | 382/101 |
| 4,965,289 | 10/1990 | Lemelson | 382/101 |
| 4,972,258 | 11/1990 | Wolf et al. | 358/93 |
| 4,999,511 | 3/1991 | Kohno | 250/272 |
| 5,053,612 | 10/1991 | Pielemier et al. | 235/462 |
| 5,123,063 | 6/1992 | Ohkubo | 382/318 |
| 5,136,665 | 8/1992 | Inoue | 382/318 |
| 5,270,222 | 12/1993 | Moslehi | 382/145 |
| 5,280,545 | 1/1994 | Masuda | 382/318 |
| 5,293,431 | 3/1994 | Hayduchok et al. | 382/101 |
| 5,311,999 | 5/1994 | Maeow et al. | 382/101 |
| 5,317,654 | 5/1994 | Perry et al. | 382/101 |
| 5,420,945 | 5/1995 | Concannon et al. | 382/318 |
| 5,592,576 | 1/1997 | Hayashi | 382/318 |
| 5,675,671 | 10/1997 | Hayduchok et al. | 382/101 |

*Primary Examiner*—Jose L. Couso
*Attorney, Agent, or Firm*—Stoel Rives LLP

[57] ABSTRACT

An optical system is disclosed that permits the viewing and reading of indicia, such as OCR scribes and/or barcodes, disposed on either side of a substrate, such as a semiconductor wafer, with a single camera. In one embodiment of the invention, optical elements are selectively positioned such that images of indicia fields disposed on either side of a substrate can be viewed (at the same magnification) whenever the substrate is in a given orientation, or such that images of indicia fields disposed on both sides of the substrate may be viewed at the same magnification, simultaneously. Optical paths may be folded to reduce the overall size of the optical viewing system.

25 Claims, 6 Drawing Sheets

OPTICAL VIEWING SYSTEM FOR SIMULTANEOUSLY VIEWING INDICIA LOCATED ON TOP AND BOTTOM SURFACES OF A SUBSTRATE

TECHNICAL FIELD

The present invention relates to optical inspection equipment and more specifically to systems for viewing and reading indicia disposed on a substrate.

BACKGROUND OF THE INVENTION

Semiconductor wafers and other substrates may be provided with indicia, such as optical character recognition (OCR) scribes and/or barcodes, that identify, among other things, the wafer number and manufacturer. The indicia may be, for example, ⅝ to ¾ inches in length and are typically provided on the wafer as a matrix of laser-etched pits.

The markings are generally provided as a relatively low-profile, rectangular field, which may be on the top or bottom surface of the semiconductor wafer. The wafers are generally processed with their top surface facing upward; however, in some applications, such as profile measurement of raw wafers, wafers are processed in both top up and top down orientations. Moreover, while wafers typically bear indicia on the top wafer surface, some wafers are marked on the bottom surface.

Heretofore known optical character recognition systems have been designed to read only one scribe window, i.e., they read only indicia that are in the normal field of view of the camera. To read indicia on both sides of the substrate using conventional systems requires the use of two cameras and illumination systems. This requires a second system that would intrude significantly into the space below the wafer otherwise used by a process machine. The utilization of a second system disadvantageously requires substantial modification of the process machine to accommodate the second system.

SUMMARY OF THE INVENTION

In accordance with a present invention an optical system is disclosed for simultaneously viewing, with a single camera having an image sensor and a lens, two or more indicia fields that may be disposed on opposing sides of a substrate such as a semiconductor wafer. The system includes optical reflecting elements such as mirrors or prisms that are selectively positioned within the field of view of the image sensor so as to divide the field of view into first and second field of view portions that bring indicia fields located, for example, on first and second sides of the semiconductor wafer into view and focus with the single viewing camera. The resultant system is only slightly larger than the viewing system employed for viewing indicia on a single side of a substrate and intrudes minimally into the space on the opposing side of the wafer from the camera. Accordingly, the presently disclosed viewing system does not significantly affect the design of process apparatus that may be disposed on the opposite side of the substrate from the camera.

A first embodiment of the invention employs a camera that includes an image sensor and a lens. The camera has a field of view having a first portion that traverses a first optical path to a first indicia location on one side of a substrate and a second portion that traverses a second optical path to a second indicia viewing location on the other side of said substrate. No optical elements are employed in the first portion of the field of view along the first optical path between the lens and an indicia field on the first side of the substrate. Two mirrors are positioned in the second portion of the field of view traversing the second optical path so as to bend the path and permit viewing of indicia on the opposing or second side of the substrate. While such a system permits viewing of indicia on both sides of the substrate, the arrangement of optical elements provides limited clearance for the wafer because the optical elements in the second optical path occupy considerable horizontal space on the side of the substrate opposite the camera. Such an arrangement also limits flexibility in the placement of the camera or in the illumination of the wafer.

A second embodiment of the invention also employs a single camera that includes an image sensor and a lens. The camera has a field of view having first and second portions that traverse the first and second optical paths to the first and second indicia locations on the first and second sides of a substrate. A mirror or prism is selectively positioned in the first optical path adjacent the first indicia location on the first side of the substrate to allow viewing of indicia at the first indicia location. Additionally, a mirror or prism is selectively positioned in the second optical path adjacent the second indicia location on the second side of the substrate to permit viewing of indicia at the second indicia location. The first and second optical paths have the same length so that the indicia fields on the respective first and second sides of the wafer are in focus simultaneously.

In a third embodiment of the invention, two mirrors are inserted into each of the first and second portions of the field of view of the camera along the first and second optical paths. The insertion of two mirrors in each of the optical paths provides considerable freedom in selecting the camera orientation and allows indicia fields to be displaced one from the other on opposing sides of the substrate. Additionally, in a circumstance in which the first and second optical paths are focused on indicia fields on opposing sides of a semiconductor wafer, the wafer may be viewed at any practical angle. Furthermore, because two mirrors are used, a true (nonmirror) image is maintained.

The presently disclosed optical viewing system is adaptable to all illumination systems whether their view is perpendicular to the substrate or wafer (coaxial lighting) or at an angle to the normal. Additionally, the optics may be simple mirrors or prisms having one or more reflective surfaces.

Additional objects and advantages of the present invention will be apparent from the following detailed description of preferred embodiments thereof, which proceeds with reference to the following drawings.

DETAILED DESCRIPTION OF PREFERRED EMBODIMENT

In accordance with the present invention an optical system is disclosed for viewing indicia that may be disposed on either or both sides of a substrate.

Figure 1:
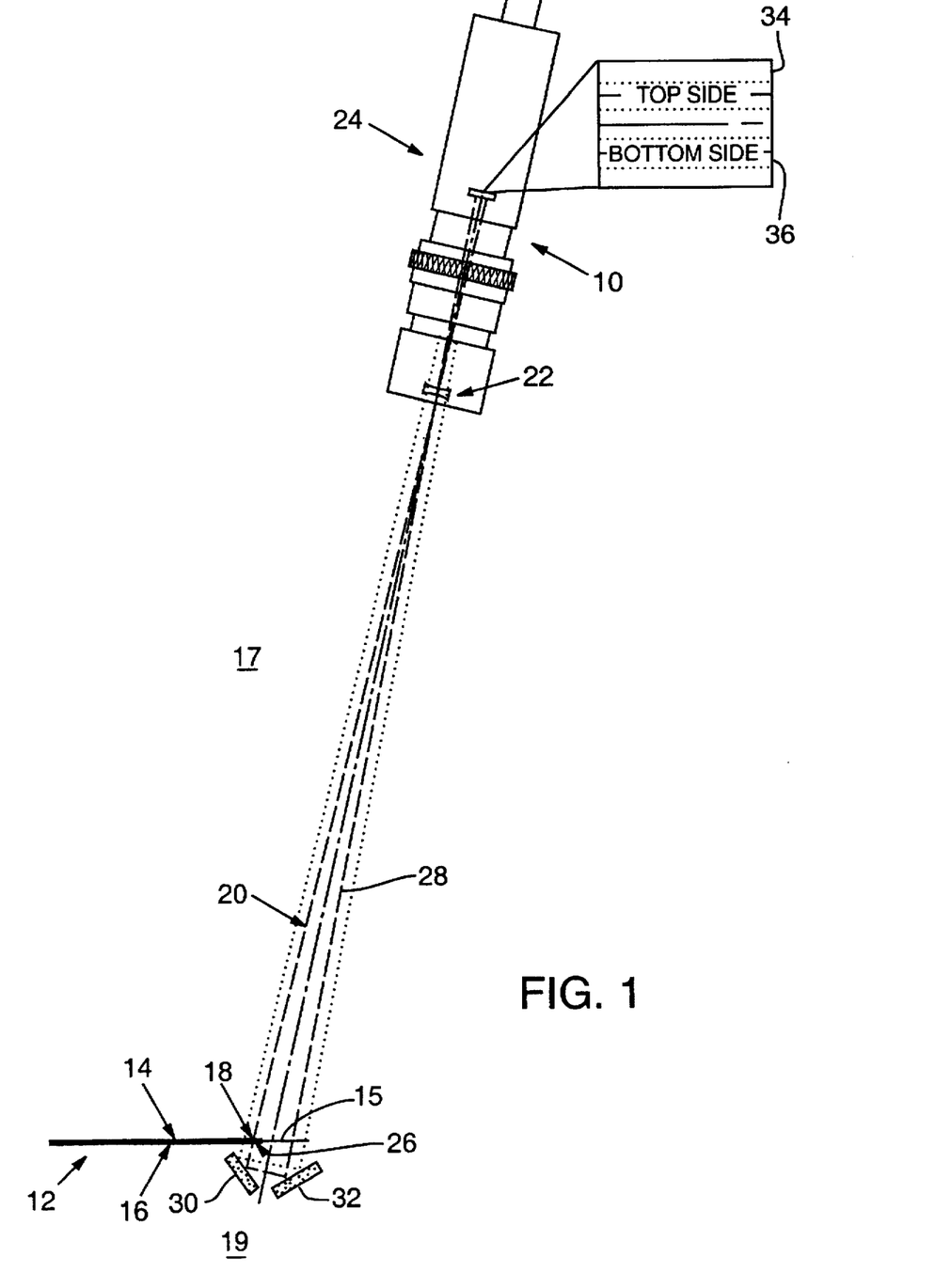
FIG. 1 is a diagram illustrating one embodiment of an optical system for simultaneously viewing indicia on the top and bottom surfaces of a substrate in accordance with the present invention.

Referring to a first embodiment illustrated in FIG. 1, a camera 24 includes an image sensor 10 and a lens 22. The camera 24 is disposed in a predetermined location with respect to a substrate 12 having a first or top side 14 and a second or bottom side 16. Indicia, such as an OCR scribe or a barcode, are disposed on the first side 14 of the substrate 12 at a first indicia location 18 and on the second side 16 of the substrate 12 at a second indicia location 26. Substrate 12 lies in a substrate plane 15 that separates a first region 17 from a second region 19 such that the first indicia location 18 and the predetermined location of camera 24 are in the first region 17 and the second indicia location 26 and a first mirror 30 are in the second region 19.

The camera 24 includes a lens 22 having a field of view having a first portion 20 viewing indicia at the first indicia location 18 along a first optical path and a second portion 28 viewing indicia at the second indicia location 26 along a second optical path.

An image of the indicia disposed on the first side of the substrate 14 at the first indicia location 18 traverses the first optical path to the lens 22 and a first field of view sensor portion 34 of the image sensor 10. The lens 22 is selected to provide appropriate magnification of the indicia disposed at the first indicia location.

Indicia present at a second indicia location 26 on the second side 16 of the substrate 12 may be viewed simultaneously by the image sensor 10 within the camera 24. The image of the indicia disposed at the second indicia location 26 traverses a second optical path that includes the first mirror 30 and a second mirror 32. The first mirror 30 is selectively angled and positioned with respect to the second indicia location 26 so as to reflect an image of the indicia at the second indicia location 26 to the second mirror 32, and the second mirror 32 is selectively angled and positioned with respect to the first mirror 30 so as to further reflect an image of the indicia at the second indicia location to the lens 22. The image of the indicia at the second indicia location is likewise magnified by the lens 22 and focused upon a second field of view sensor portion 36 of the image sensor 10.

The above-described viewing system may thus be employed for viewing OCR scribes or barcodes that may be disposed on either side of a semiconductor wafer or in any other situation in which it is desirable to view indicia that may be disposed on either or both sides of a substrate. More specifically, indicia disposed on the opposing side of the substrate, which would not be within the normal field of view of the sensor 10, may be viewed along with indicia that would be within the normal field of view of the sensor 10 using the single sensor 10 and the single lens 22 plus some relatively inexpensive optical components. As a consequence of the utilization of the presently disclosed optical system, duplication of more expensive components such as the camera 24 is avoided and space on the side of the substrate opposing the camera is generally left available for substrate processing equipment. Because the embodiment of FIG. 1 provides no correction of the optical path length and the optical path lengths differ, the lens 22 is required to have sufficient depth of field to maintain indicia disposed on respective sides of the substrate in acceptable focus.

Figure 2:
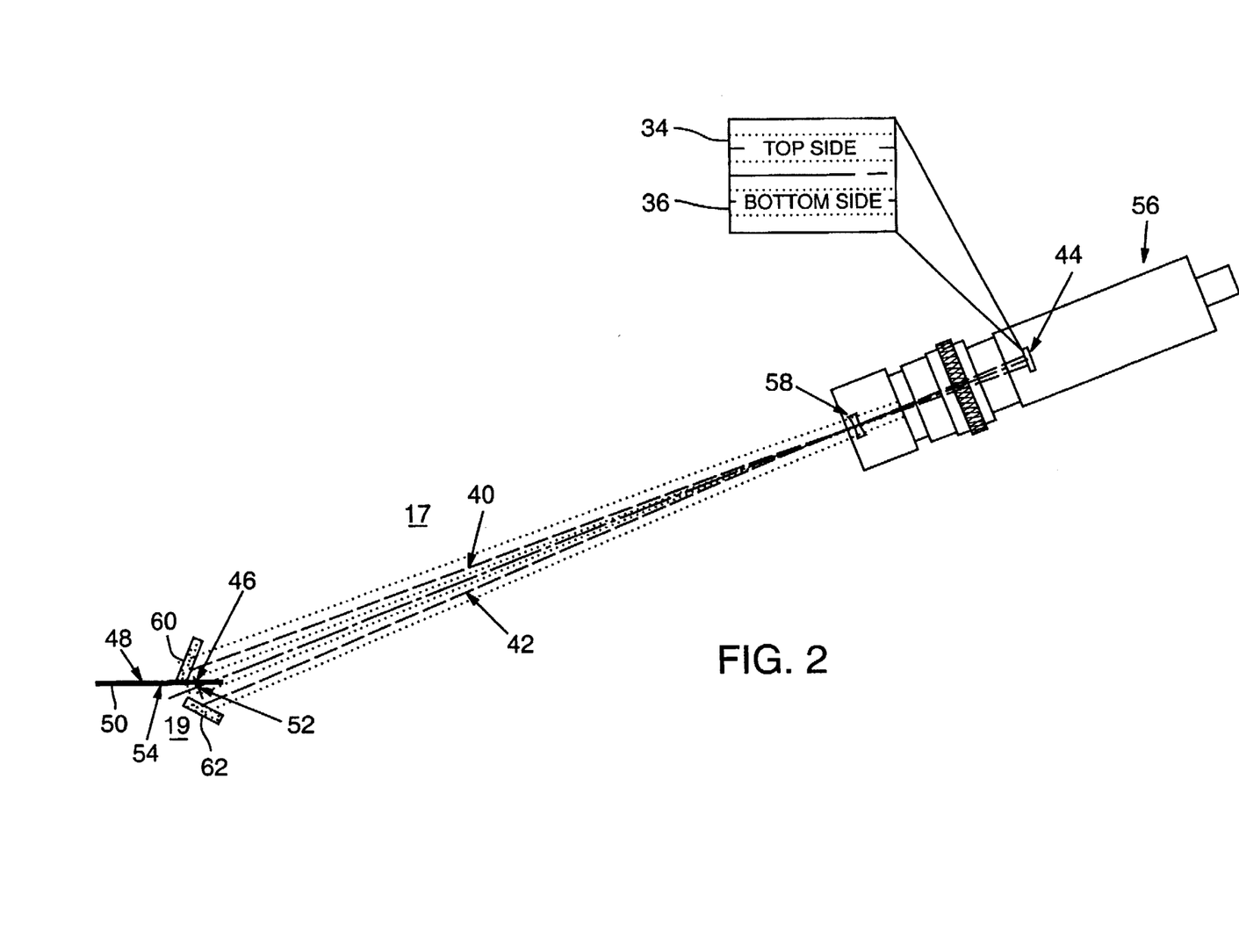
FIG. 2 is a diagram illustrating a second embodiment of a system for viewing indicia on the top and bottom surfaces of a substrate in accordance with the present invention.

In a second embodiment illustrated in FIG. 2, a camera 56 having a sensor 44 and a lens 58 has a field of view having a first portion 40 and a second portion 42 traversing the first and second respective optical paths to a first indicia location 46 on a first or top side 48 of a substrate 50 and a second indicia location 52 on a second or bottom side 54 of the substrate 50 respectively. The first optical path extends from the sensor 44 through the lens 58 and includes a first mirror 60. The first mirror 60 is selectively positioned with respect to the first side 48 of the substrate 50 so as to reflect an image of the indicia disposed at the first indicia location 46 to the lens 58. As illustrated in FIG. 2, the second optical path extends from the sensor 44 through the lens 58 and includes a second mirror 62. The image sensor 44, lens 58, first mirror 60, and second mirror 62 are positioned with respect to the respective first and second indicia locations 46 and 52 such that the first and second optical paths are of equal length. As a consequence of the use of a single mirror in each of the optical paths, mirror images of the indica present at first and second indicia locations 46 and 52 are presented to the image sensor 44. Nevertheless, because the optical path lengths are of equal length in the embodiment of FIG. 2, the images of indicia disposed on respective first and second sides of the substrate 50 may be finely focused at the image sensor 44 and the selection of the lens 58 is not dependent upon the depth of field of the lens 58 as in the embodiment of FIG. 1. The FIG. 2 embodiment is useful for some process configurations; however, in this embodiment, the first and second mirrors 60 and 62 are disposed close to the substrate 50 and the mounting position and orientation of the image sensor 44 are restricted.

Figure 3:
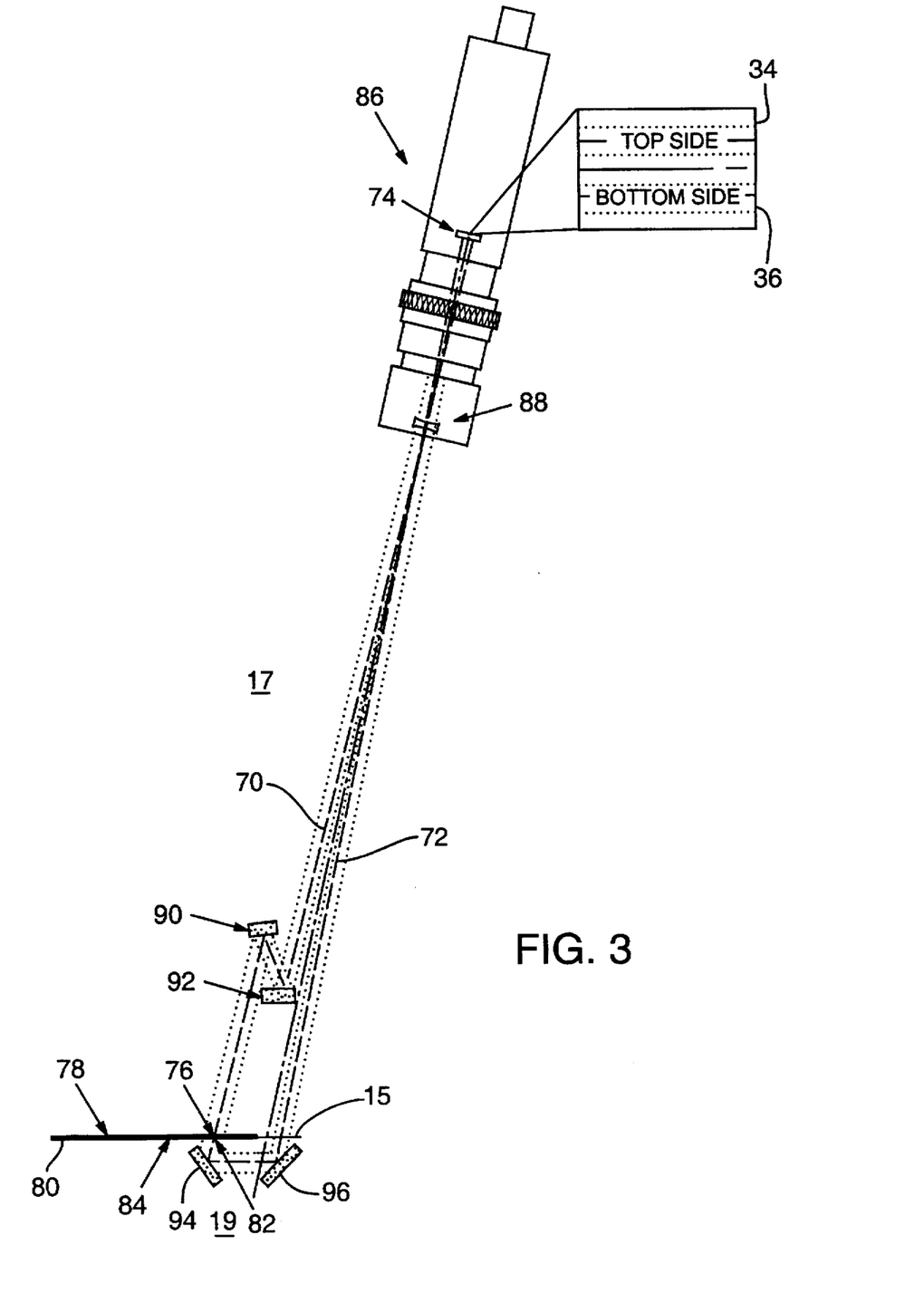
FIG. 3 is a diagram illustrating a third embodiment of an optical system for viewing indicia on the top and bottom surfaces of a substrate in accordance with the present invention.

In a third embodiment illustrated in FIG. 3, a camera 86 includes an image sensor 74 and a lens 88 having a field of view having first and second portions 70 and 72 traversing first and second optical paths to first and second indicia locations 76 and 82 on first and second sides 78 and 84 of a substrate 80. The first and second optical paths are of equal length to ensure that indicia on both sides of the substrate are in focus simultaneously. Additionally, true, nonmirror images are provided. The first and second optical paths are provided between the image sensor 74 and the first indicia location 76 on the first or top side 78 of the substrate 80 and the second indicia location 82 on the second or bottom side 84 of the substrate 80 respectively. The first optical path includes a first mirror 90 and a second mirror 92. The first mirror 90 is selectively positioned and angled with respect to the first indicia location 76 on the first side 78 of the substrate 80 so as to reflect an image of indicia disposed at the first indica location 76 to the second mirror 92. The second mirror, in turn, is selectively positioned and angled so as to reflect an image of the indicia from the first mirror 90 to the lens 88. As further illustrated in FIG. 3, the second optical path includes a third mirror 94 and a fourth mirror 96. The third mirror 94 is selectively positioned and angled with respect to the second side 84 of the substrate 80 so as to reflect an image of indicia disposed at the second indica location 82 to the fourth mirror 96. The fourth mirror 96 is selectively positioned and angled so as to reflect an image of the indicia from the third mirror 94 to the lens 88. In the FIG. 3 embodiment, the first and second optical paths are of equal length so that the indicia disposed at first and second indicia locations 76 and 82 have the same scale factors. This embodiment also advantageously provides flexibility in the positioning of the image sensor 74 with respect to the substrate 80 since the image sensor 74 may be disposed at any angle with regard to the substrate 80.

Figure 4:
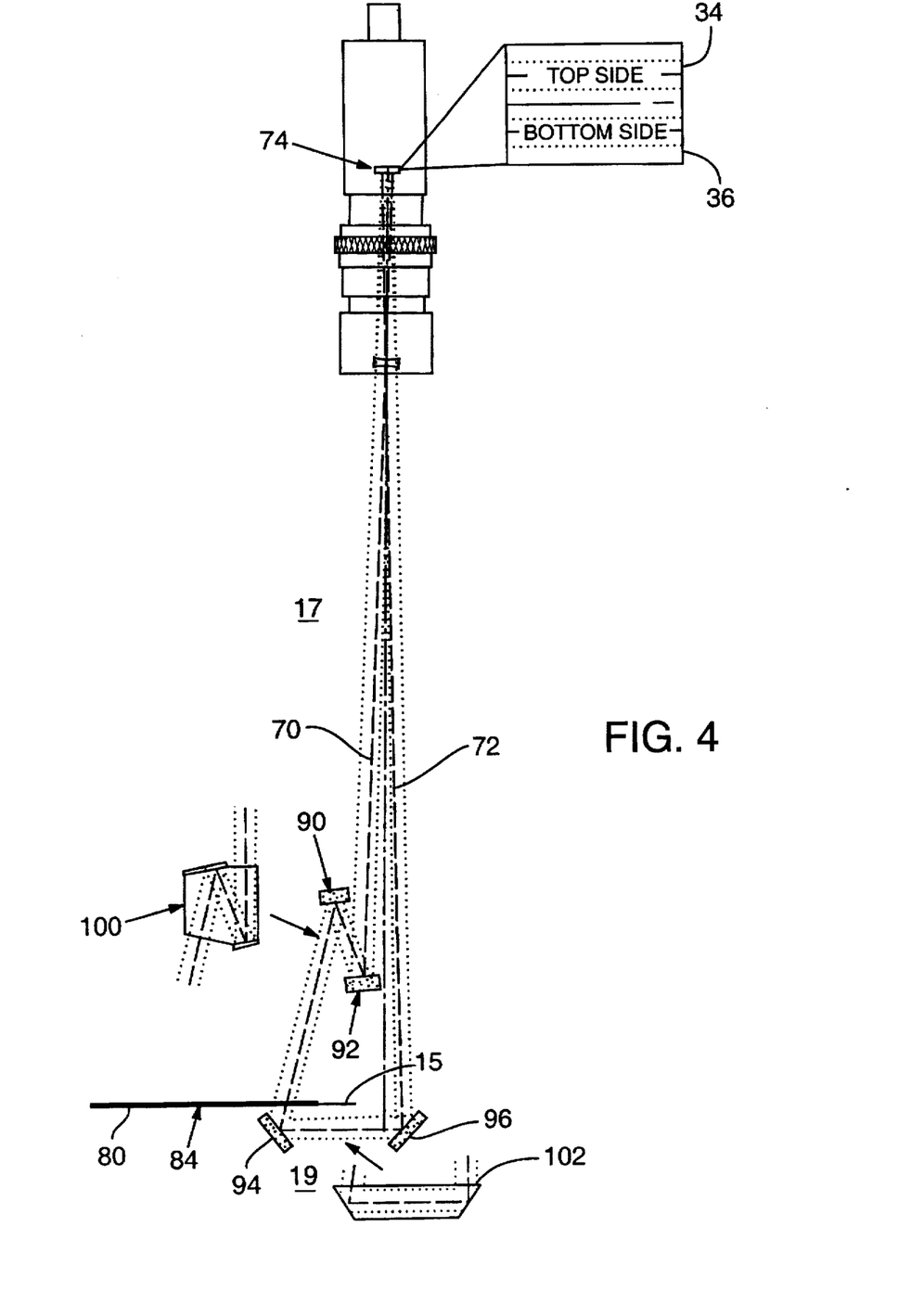
FIG. 4 illustrates an alternative optical arrangement for the embodiment of FIG. 3.

FIG. 4 illustrates a variation of the optical system illustrated in FIG. 3. More particularly, referring to FIGS. 3 and 4, a first prism 100 is substituted for first and second mirrors 90 and 92 respectively in the first optical path and a second prism 102 is substituted for the third and fourth mirrors 94 and 96 in the second optical path. The resulting optical system, like the FIG. 3 embodiment, provides the ability to maintain the first and second optical paths within respective first and second field of view portions 70 and 72 of equal length such that the scale factors for the respective images are preserved at the image sensor 74. Additionally, the optical viewing system illustrated in FIG. 4 presents true (nonmirror) images of the indicia disposed at the first and second indicia locations on the substrate 101.

Figure 5:
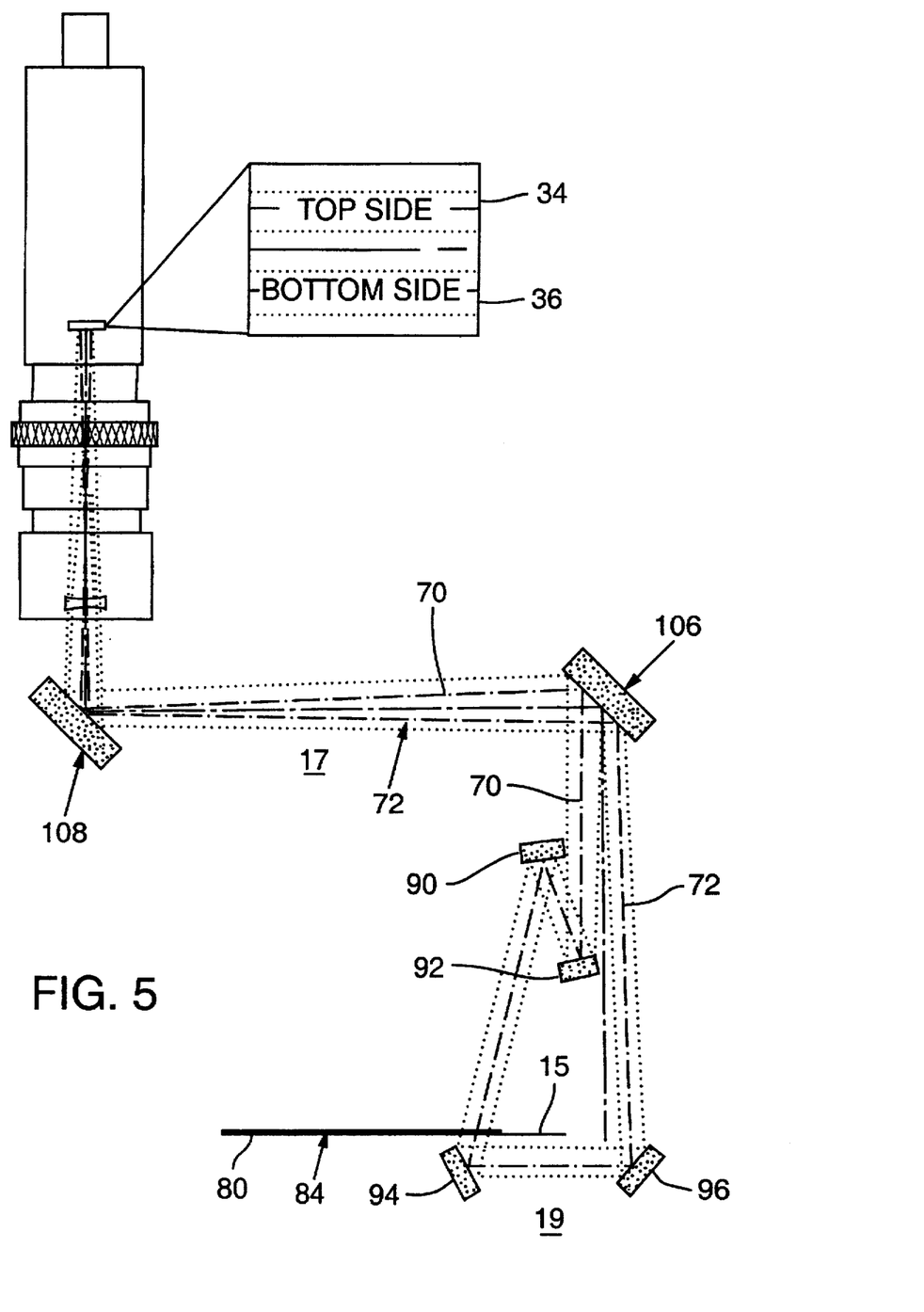
FIG. 5 illustrates a further alternative optical arrangement for the optical system of FIG. 3 in which the optical paths are folded to reduce the overall size of the optical viewing system.

In another variation of the embodiment of FIG. 3 illustrated in FIG. 5, the first and second optical paths are folded so as to permit the reduction of the overall package size of the optical viewing system. Referring to FIG. 5, the optical system of FIG. 3 further includes a first path folding mirror 106 and a second path folding mirror 108 disposed in the first and second optical paths respectively. As with the FIG. 3 embodiment, the FIG. 5 embodiment permits the image sensor to be placed at any angle with respect to the substrate, presents true (nonmirror) images of the indica at the image sensor, and presents equally scaled images of the indicia at the image sensor since equal length optical paths are maintained. Additionally, the depth of field of the lens is not critical in the optical system illustrated in FIG. 5 since the optical paths are of equal length. It should be further appreciated that a first prism may be substituted for the mirrors 90 and 92 and a second prism may be substituted for the mirrors 94 and 96 as discussed in connection with the FIG. 4 embodiment of the optical viewing system. Similarly, a prism (not shown) may be substituted for the first and second path folding mirrors 106 and 108.

Figure 6:
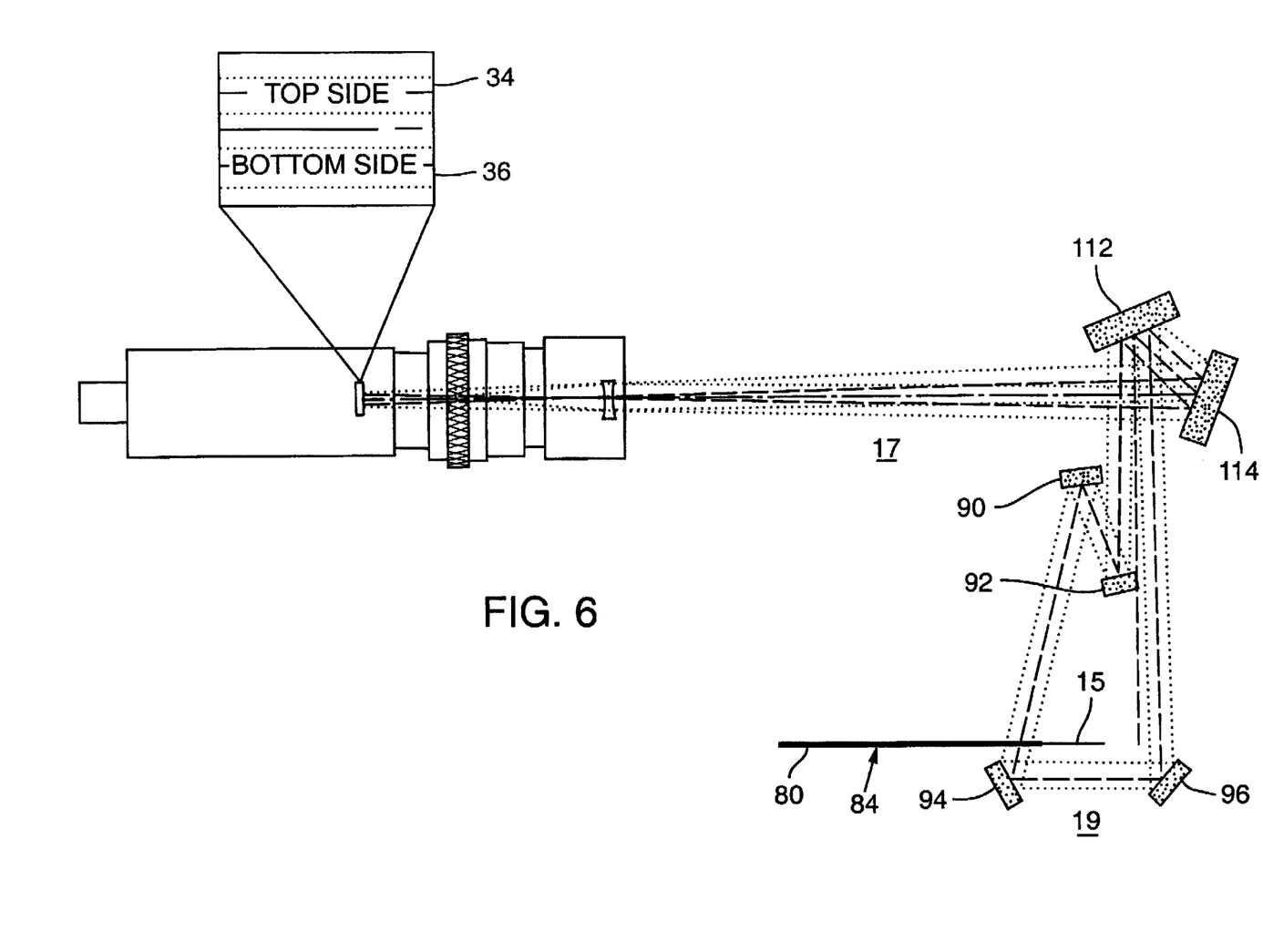
FIG. 6 is a diagram illustrating a fifth embodiment of a system for simultaneously viewing indicia on the top and bottom surfaces of a substrate in accordance with the current invention.

Another variation of the FIG. 3 optical viewing system is illustrated in FIG. 6. The FIG. 6 embodiment employs a path folding arrangement that allows the image sensor or camera to be disposed generally horizontally above a plane defined by the substrate top surface. More particularly, a first path folding mirror 112 is disposed in the first and second optical paths. The first path folding mirror 112 reflects images of the first and second indicia to a second path folding mirror 114 disposed in the optical paths. The second path folding mirror 114 reflects images of the first and second indicia to the camera or sensor. In the above-described manner a highly compact optical viewing system is provided that provides equal scaling of indicia disposed on both sides of a substrate simultaneously while providing true nonmirror images of such indicia.

The output of the image sensor, which may comprise a camera, may be fed to an OCR reader for reading OCR scribes present on one or both sides of the substrate or alternatively to a barcode reader for reading barcode indicia present on one or both sides of the substrate.

The above-described methods and apparatus are illustrative of a novel optical viewing system for viewing indicia disposed on either or both sides of a substrate. Other modifications, embodiments, and departures from the present disclosure will be apparent to those skilled in the art without departing from the inventive concepts contained herein. Accordingly, the present invention is to be viewed as embracing each and every novel feature and novel combination of features present in or possessed by the techniques and apparatus herein disclosed and is to be viewed as limited solely by the scope and spirit of the appended claims.

I claim:

1. An apparatus capable of simultaneously viewing indicia located on opposing sides of a semiconductor substrate that lies on a substrate plane that separates first and second regions such that a first indicia is located at a first indicia reading location on a first side of said semiconductor substrate in said first region and a second indicia is located at a second indicia reading location on a second side of said semiconductor substrate in said second region, comprising:

an image sensor having first and second different field of view sensor portions and being positioned at a sensor location in said first region;

a first optical path between said image sensor and said first indicia reading location on said first side of said semiconductor substrate, said first field of view sensor portion of said image sensor operative to receive a first image of first indicia at said first indicia reading location via said first optical path;

an optical light directing element positioned in said second region; and a second optical path traversing said substrate plane and having at least first and second path components, said first path component being between said image sensor and said optical light directing element, said second path component being between said optical light directing element and said second indicia reading location on said second side of said semiconductor substrate, and said second field of view sensor portion of said image sensor operative to receive a second image of second indicia at said second indicia reading location via said second optical path at the same time that said image sensor is operative to receive said first image.

2. The apparatus of claim 1 wherein at least one of said first and said second optical paths includes at least two optical light directing elements.

3. The apparatus of claim 2 wherein at least one of said optical light directing elements includes a prism.

4. The apparatus of claim 1 wherein said first optical path includes at least one optical light directing element.

5. The apparatus of claim 4 wherein said first and second optical paths have substantially the same length.

6. The apparatus of claim 1 wherein said image sensor comprises a camera.

7. The apparatus of claim 6 wherein said camera comprises a video camera.

8. The apparatus of claim 1 wherein at least one path folding mirror is disposed in both said first and second optical paths.

9. The apparatus of claim 8 wherein at least two path folding mirrors are disposed in said first and second optical paths.

10. A method for viewing indicia located on opposing sides of a semiconductor substrate that lies on a substrate plane that separates first and second regions such that a first indicia is located at a first indicia reading location on a first side of said semiconductor substrate in said first region and a second indicia is located at a second indicia reading location on a second side of said semiconductor substrate in said second region, the method comprising the steps of:

receiving on a first field of view sensor portion of an image sensor a first image of said first indicia at said first indicia reading location on said first side of said semiconductor substrate, said image sensor being positioned in said first region, said first image propagating along a first optical path between said first indicia reading location and said first field of view sensor portion of said image sensor;

receiving on a second field of view sensor portion of said image sensor a second image of said second indicia at said second indicia reading location on said second side of said semiconductor substrate substantially simultaneously with receiving said first image, said second image propagating along a second optical path that traverses said substrate plane and has first and second path components such that said first path component connects said second indicia reading location and an optical light directing element positioned in said second region and such that said second optical path connects said optical light directing element and said second field of view sensor portion of said image sensor.

11. The method of claim 10 further including the step of folding at least one of said first and second optical paths.

12. The method of claim 11 wherein said first and second optical paths have respective first and second optical lengths and said step of folding at least one of said first and second optical paths comprises the step of folding at least one of said optical paths such that said first optical length is equal to said second optical length.

13. The method of claim 12 wherein said step of folding at least one of said first and second optical paths comprises the step of folding at least one of said first and second optical paths with at least two mirrors.

14. The method of claim 10 further including the step of folding at least one of said first and second optical paths with at least one prism such that the optical length of said first optical path is equal to the optical length of said second optical path.

15. The method of claim 10 further including the step of folding both of said first and second optical paths with at least one path folding mirror.

16. The method of claim 14 wherein said step of folding both of said first and second optical paths comprises the step of folding said first and second optical paths with at least two path folding mirrors.

17. The method of claim 10 in which said semiconductor substrate comprises a wafer.

18. The method of claim 10 in which said first or second indicia comprise an OCR scribe or a bar code.

19. The apparatus of claim 1 in which said semiconductor substrate comprises a wafer.

20. The apparatus of claim 1 in which said first or second indicia comprise an OCR scribe or a bar code.

21. The method of claim 10 in which said image sensor comprises a camera.

22. The apparatus of claim 1 in which said image sensor consists essentially of a single camera.

23. The method of claim 10 in which said image sensor consists essentially of a single camera.

24. The apparatus of claim 1 in which said first path component traverses said substrate plane.

25. The method of claim 10 in which said first path component traverses said substrate plane.

* * * * *